(12) United States Patent
Guo et al.

(10) Patent No.: US 8,372,908 B2
(45) Date of Patent: Feb. 12, 2013

(54) METHOD OF FABRICATION OF NANOPARTICULATE COMPOSITES USING MONOMER STABILIZATION

(75) Inventors: Zhanhu Guo, Beaumont, TX (US); H. Thomas Hahn, Malibu, CA (US)

(73) Assignee: The Regents of the University of California, Oakland, CA (US)

( * ) Notice: Subject to any disclaimer, the term of this patent is extended or adjusted under 35 U.S.C. 154(b) by 71 days.

(21) Appl. No.: 12/467,196

(22) Filed: May 15, 2009

(65) Prior Publication Data
US 2009/0318641 A1 Dec. 24, 2009

Related U.S. Application Data

(60) Provisional application No. 61/053,811, filed on May 16, 2008.

(51) Int. Cl.
*C08K 3/22* (2006.01)
*C08F 2/00* (2006.01)
(52) U.S. Cl. .......................................... 524/431; 526/88
(58) Field of Classification Search .................... 524/431
See application file for complete search history.

(56) References Cited

U.S. PATENT DOCUMENTS

| | | | |
|---|---|---|---|
| 6,627,314 B2 | 9/2003 | Matyjaszewski et al. | |
| 6,667,360 B1 | 12/2003 | Ng et al. | |
| 7,348,365 B2 * | 3/2008 | Lee et al. | 516/78 |
| 7,455,886 B2 | 11/2008 | Rao et al. | |
| 2009/0084874 A1 * | 4/2009 | Alam et al. | 241/21 |

OTHER PUBLICATIONS

Composites Science and Technology, 68, 1513-1520, Oct. 2007.*
Guo et al., Journal of Materials Chemistry, 16, 2800-2808, 2006.*

* cited by examiner

*Primary Examiner* — Hui Chin
(74) *Attorney, Agent, or Firm* — John P. O'Banion

(57) ABSTRACT

An improved method is provided to prepare reinforced resin nanocomposites without the need of surfactants or coupling agents. The present invention comprises the use of monomers for improving the dispersion of nano-sized materials and enhancing the particle/matrix interaction. One comprises mixing a plurality of nanoparticles with a monomer resin to form a mixture, blending a catalyst and a promoter with the mixture, and curing the blended mixture to form a polymerized nanocomposite. The monomers, which serve to stabilize the nanoparticles, are covalently bound onto the nanoparticle surface and copolymerize with non-bound monomers after introduction of a catalyst and a promoter that initiate polymerization. Without any additional surfactant or coupling agent, the resin is chemically bound onto the nanoparticle surface and protects the iron nanoparticles from agglomeration and oxidation.

29 Claims, 12 Drawing Sheets

METHOD OF FABRICATION OF NANOPARTICULATE COMPOSITES USING MONOMER STABILIZATION

CROSS-REFERENCE TO RELATED APPLICATIONS

This application claims priority from U.S. provisional application Ser. No. 61/053,811 filed on May 16, 2008, incorporated herein by reference in its entirety.

STATEMENT REGARDING FEDERALLY SPONSORED RESEARCH OR DEVELOPMENT

This invention was made with Government support under Grant No. FA9550-05-1-0138, awarded by the Air Force Office of Scientific Research (AFOSR). The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates generally to the manufacture of nanocomposites comprising nano-sized materials and polymer resin, and more specifically to the manufacture of nanocomposites using monomer stabilization.

2. Description of Related Art

Vinyl ester resin has been widely used in the marine (Naval submarine) industry due to its good mechanical properties such as large Young's Modulus and tensile strength, and its superior resistance to moisture and chemicals. As a thermosetting material, vinyl ester resin can be cured easily in an ambient condition and was reported to strongly depend on curing temperature, initiators and accelerator levels. Separately, nano-sized materials are of tremendous interest in different fields of chemistry and physics due to their unique magnetic properties such as high coercivity and chemical catalytic properties inherent with their small size and high specific surface area.

Polymeric nanocomposites reinforced with nanoparticles have attracted much interest due to their cost-effective processability and tunable physical properties such as mechanical, magnetic, optical, electric and electronic properties. Inorganic nanofillers dispersed into polymer matrices can stiffen and strengthen the nanocomposites, increase the electric and thermal conductivities, introduce unique physicochemical properties such as magnetic and optical properties, and even improve the shape replicability. The use of proper functional nanoparticles within a polymeric matrix renders the resulting nanocomposites applicable in devices such as photovoltaic (solar) cells, polymer-electrolyte membrane fuel cells, and magnetic data storage systems. The functional groups of the polymer surrounding the nanoparticles enable these nanocomposites to be used for various industrial applications, such as site-specific molecule targeting applications in the biomedical areas and explosive detection sensors. Recent investigations on nanocomposites reinforced with different ceramic nanoparticles, such as alumina, zinc oxide, iron oxide and copper oxide, have shown that the ceramic nanoparticle itself has some effect on the curing process and subsequent performance of nanocomposites.

Nonetheless, industrial applications of bare vulnerable metal nanoparticles are still a challenge due to their aggregation and easy oxidation. To achieve a stable nanoparticle usable system in the context of nanocomposites, metal nanoparticles are usually stabilized by a surfactant/polymer or a noble metal shell, which reduces the particle agglomeration in a colloidal suspension or protects them from oxidation in harsh environments. High particle loading, required for certain applications such as solar cells, electromagnetic interfaces (EMI), microwave absorbers and giant magnetoresistance sensors, usually has a deleterious effect on the mechanical properties due to the particle agglomeration and poor interfacial bonding between the nanoparticle and polymer matrix. Therefore, particles are functionalized by a surfactant or a coupling agent to achieve uniform particle dispersion in the matrix and chemical bonding at the interface. There still lacks a systematic study of the nanoparticle effect on the curing process for high-quality vinyl ester resin nanocomposite fabrication, especially for the case of reactive magnetic metallic nanoparticles. In addition, the functionalization of nanoparticles made the composite fabrication more complicated and costly.

Metallic multilayer giant magnetoresistance sensors (GMRs) have found wide applications in areas such as biological detection, magnetic recording and storage systems, and rotational sensors in automotive systems since the discovery of GMR in 1988. Compared with the metal-based multilayer GMR sensors, the polymer nanocomposite-based sensors would have the benefit of easy manipulation and cost-effective fabrication. However, the challenge is to obtain high-quality polymer nanocomposites with nanoparticles uniformly dispersed in the polymer matrix. In other words, to prevent particle agglomeration is an inherent challenge in the composite fabrication. In addition, the interaction between the nanoparticles and the polymer matrix plays an important role in the quality of the nanocomposite. Poor linkage, such as the presence of gas voids may result in deleterious effects on the mechanical properties of the nanocomposites.

BRIEF SUMMARY OF THE INVENTION

Overcoming one or more of these limitations, the present invention comprises an improved method to prepare reinforced resin nanocomposites without the need of surfactants or coupling agents. Instead, the present invention comprises the use of monomers for improving the dispersion of nano-sized materials and enhancing the particle/matrix interaction. The monomers, which importantly serve to stabilize the nanoparticles, are covalently bound onto the nanoparticle surface and copolymerize with non-bound monomers after introduction of a catalyst and a promoter that initiate polymerization. Without any additional surfactant or coupling agent, the resin is chemically bound onto the nanoparticle surface and protects the iron nanoparticles from agglomeration and oxidation. Physical characteristics, such as tensile strength and Young's Modulus, are larger than those of cured pure resin. The resulting magnetically harder nanocomposites with an increased thermal stability are ferromagnetic at room temperature and have potential applications in the marine systems, magnetoresistive sensors and microwave absorption systems.

BRIEF DESCRIPTION OF THE SEVERAL VIEWS OF THE DRAWING(S)

The invention will be more fully understood by reference to the following drawings which are for illustrative purposes only:

Figure 1:
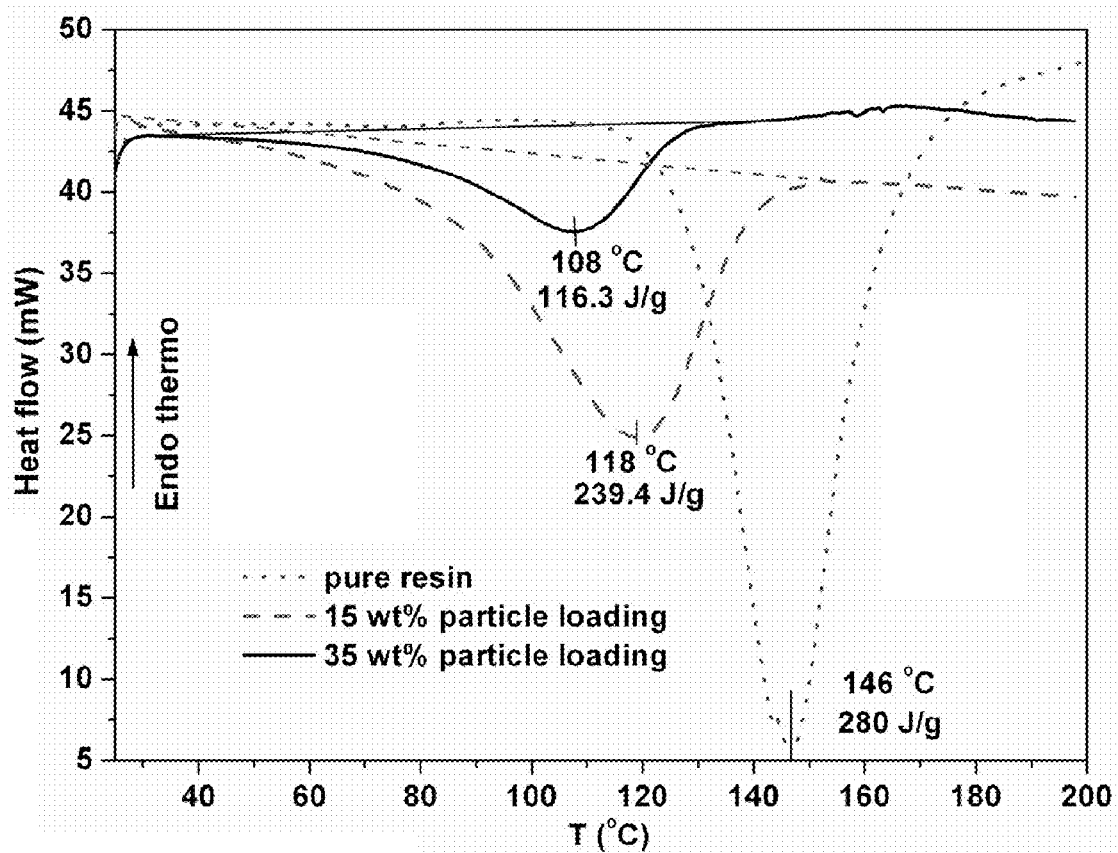
FIG. 1 shows DSC curves of the liquid pure resin and vinyl ester nanocomposites with different iron nanoparticle loadings.
Figure 2:
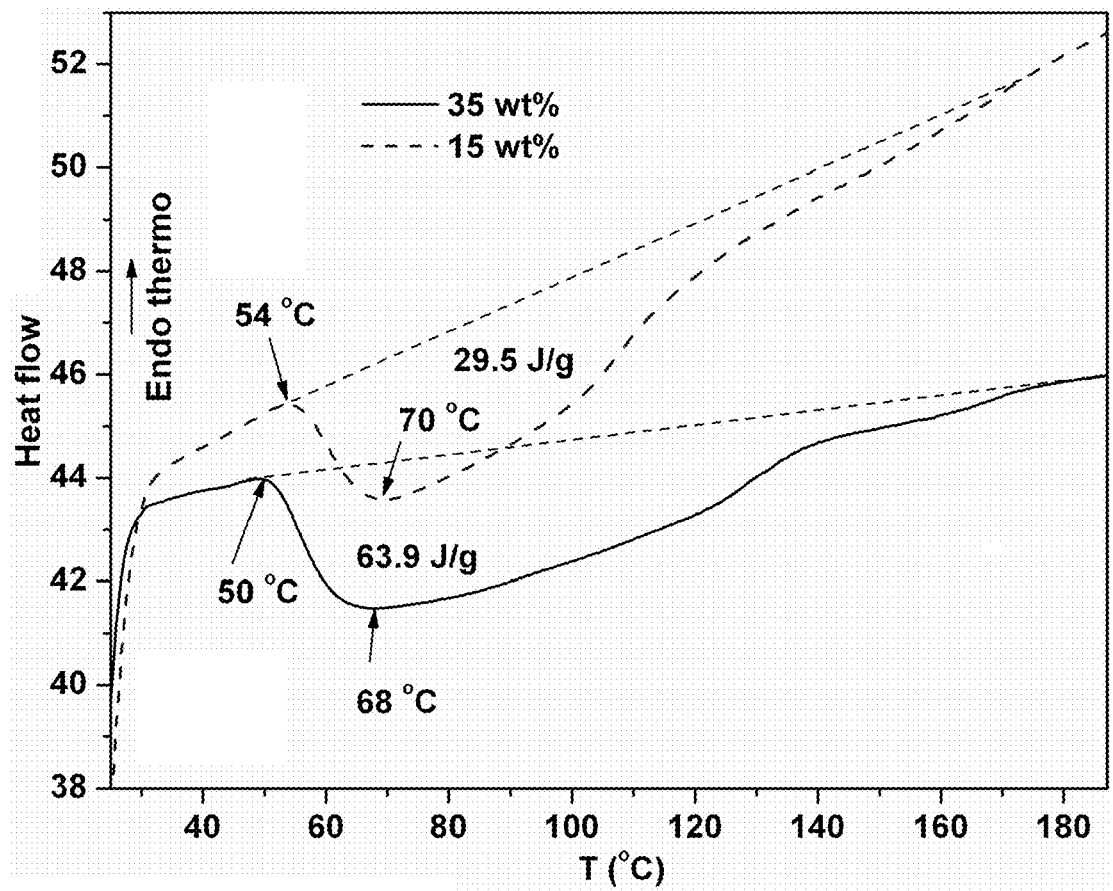
FIG. 2 shows DSC curves of the vinyl ester nanocomposites after a 24-hour room temperature curing.

The features mentioned above in the summary, along with other features of the inventions disclosed herein, are described below with reference to the drawings. The illustrated embodiments in the figures listed below are intended to illustrate, but not to limit, the inventions.

DETAILED DESCRIPTION OF THE INVENTION

Referring more specifically to the drawings, for illustrative purposes the present invention is embodied and characterized by that shown in FIG. 1 through FIG. 12. It will be appreciated that the apparatus may vary as to configuration and as to details of the parts, and that the method may vary as to the specific steps and sequence, without departing from the basic concepts as disclosed herein.

In one embodiment of the present invention, a nanocomposite comprises nanoparticles, for example, nano-metals, combined with at least one polymer fabricated by a monomer of, for example, a vinyl ester, for particle stabilization without any additional surfactant or coupling agent. In one particular embodiment, the nano-metal comprises iron, although other nanomaterials are contemplated for effective manufacture of a nanocomposite. As with other embodiments with other polymers, the vinyl ester monomer serves as a coupling agent with one side covalently bound onto the nanoparticle surface by a displacement reaction and the other end copolymerized with non-bound vinyl ester resin monomers to form a robust unity. The addition of iron nanoparticles favors the nanocomposite fabrication with a lower initial curing temperature. Vinyl ester resin in the nanocomposites becomes thermally stable as compared to the pure vinyl ester resin. An enhanced mechanical property is observed due to the uniform particle dispersion and the introduced interfacial covalent bondage. The iron nanoparticles become magnetically harder (with a larger coercivity) after dispersion in the vinyl ester resin matrix.

It is contemplated that nanocomposites of the present invention would comprises metal such as chromium, manganese, iron, cobalt, nickel, palladium, silver, platinum, copper, zinc, silver, gold, or lanthanum, although other metals may be suitable for certain applications useful for nanocomposites. It is further contemplated that the nano-metal particles comprise pure metals, alloys of metal particles, or oxides of metals that may have a metal core-oxide shell structure. An embodiment of an inventive nanocomposite herein could include a plurality of different nano-metal particles or alloys or oxides thereof.

One embodiment of the inventive nanocomposite was made and is set forth as an example of nanocomposites contemplated as part of the present invention. The polymeric matrix used was a vinyl ester resin, Derakane momentum 411-350 (manufactured by the Dow Chemical Company), which is a mixture of 55 wt % vinyl ester with an average molecule weight of 970 g/mole and 45 wt % styrene monomers. Styrene with only one unsaturated carbon-carbon double bond provides linear chain extension. Vinyl-ester monomers with two reactive vinyl end groups enable the cross-linking for network formation. The liquid resin has a density of 1.045 g/cm$^3$ and a viscosity of 350 centipoise (cps) at room temperature. Trigonox 239-A (curing catalyst or initiator, organic peroxide, liquid) was purchased from Akzo Nobel Chemicals. Cobalt naphthenate (CoNap, OM Group, Inc.) was used as a catalyst promoter (accelerator) to decompose the catalyst at room temperature. Iron nanoparticles made by QuantumSphere, Inc. of Santa Ana, Calif., with an average diameter of 20 nm and a specific surface area of 35-55 m$^2$/g (BET) were produced and transported in the inert gas to prevent the oxidation. The active nanoparticles were used as nanofillers for the nanocomposite fabrication and also served as a metal precursor for the displacement between the monomers and the metals.

In one embodiment of the inventive method described herein, a specific amount of iron nanoparticles with an average size of 20 nm (provided by QuantumSphere Inc.) and the nitrogen degassed vinyl ester resin (30 g) were transferred into a 2-neck flask. The sealed flask was ultrasonically stirred for about 2 hours to completely wet the nanoparticles by the resin. The suspended solution was further stirred by hand and ultrasonically for another 2 hours until uniform dispersion is obtained. A mixture of the nitrogen degassed catalyst (2.0 wt %, Trigonox 239-A, organic peroxide, Akzo Nobel Chemicals) and promoter (0.3 wt %, cobalt naphthenate, OM Group, Inc.) was introduced quickly. The final solution was poured into a silicone mold for room temperature curing. All the reactants were added in an ultrahigh purity nitrogen protection condition, and the iron nanoparticles were handled in a fume hood due to high risk of fire and respiratory health issues. The optimum curing condition was investigated by a differential scanning calorimetry (DSC) with a heating rate of 20° C./min and a nitrogen flow rate of 10 $cm^3$/min (ccpm). The reaction enthalpy (J/g) and residual heat of reaction were measured from the area under the DSC peaks.

Nanocomposites with different particle loadings were fabricated based on the functionality of the vinyl ester resin monomers and the reactivity of the metal nanoparticles. Weight percentage of nanoparticles in the nanocomposites and thermal stability of the nanocomposites were determined by the thermogravimetric analysis (TGA, PerkinElmer) with an argon flow rate of 50 ccpm and a heating rate of 10° C./min. The dispersion quality of the nanoparticles in the vinyl-ester resin matrix was investigated by scanning electron microscopy (SEM) on the polished nanocomposite cross-sectional area. The SEM samples were carefully prepared as follows. The cured composite samples were polished with a 4000-grit sand paper and a following 50 nm alumina nanoparticle aqueous solution polishing to achieve a smooth surface, then washed with DI water, and followed by sputter coating a 3 nm gold. The fracture surface of the nanocomposites after the tensile test was sputter coated with a 3 nm gold studied for SEM investigation.

An x-ray photoelectron spectroscopy (XPS) was utilized to investigate the nanocomposite formation mechanisms. XPS was conducted on a Kratos Axis Ultra XPS system using a monochromatic Al Kα source for irradiation. The sample was prepared by allowing complete reaction between the nanoparticles and vinyl ester resin monomers under ultrasonication without curing, then washing with excessive anhydrous tetrahydrofuran to remove excessive resin.

The mechanical properties were evaluated by tensile tests following the American Society for Testing and Materials standard (ASTM, 2005, standard D 1708-02a). An Instron 4411 with Series IX software testing machine was used to measure the tensile strength and Young's modulus. The dog-bone shaped specimens were prepared as described in the nanocomposite fabrication section. The specimen surfaces were smoothed with an abrasive sand paper (1000 grit). A crosshead speed of 15 mm/min was used and strain (mm/mm) was calculated by dividing the crosshead displacement (mm) by the gage length (mm). The magnetic properties were investigated in a 9-Tesla Physical Properties Measurement System (PPMS) by Quantum Design.

The iron nanoparticles were observed to have a significant effect on the curing process as investigated by DSC. The initial and peak exothermal curing temperatures were substantially decreased after the incorporation of nanoparticles in the liquid resin. The released reaction heat (based on the neat resin) decreased with the increase of the particle loading as marked in FIG. 1. The lower initial exothermal curing temperature indicates that the addition of iron nanoparticles favors a lower temperature curing.

The DSC study on the 24-hour room temperature cured nanocomposites showed a similar 75% polymerization for composites with two different loadings. However, a lower curing temperature was observed in composites with a higher particle loading, shown in FIG. 2. As compared to the lower initial curing temperature in the liquid composite samples, the higher initial curing temperature in the composites after 24-hour room-temperature curing is due to larger molecule chains which require more energy for further polymerization. In contrast to the lower reaction heat in the liquid nanocomposites with higher particle loading, the room temperature cured nanocomposites with higher particle loading have higher reaction heat. This is due to more monomers surrounding the particle surface with a less molecular mobility for polymerization.

Figure 3:
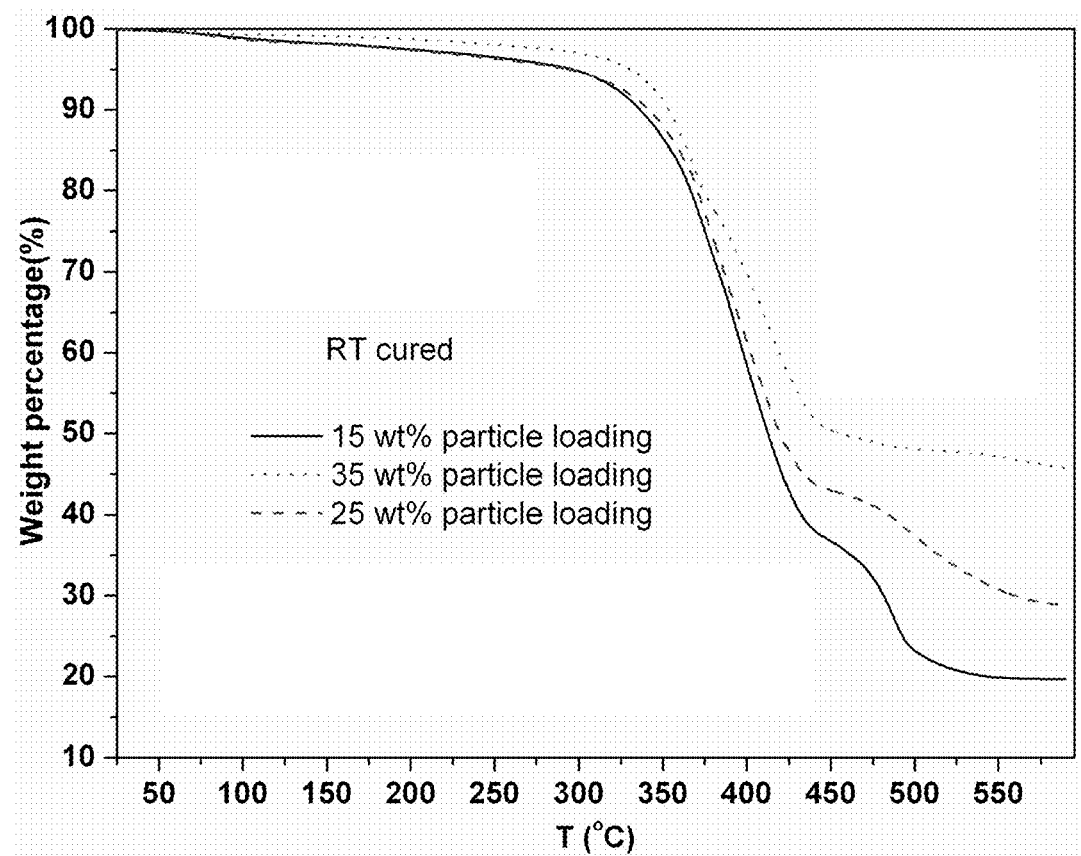
FIG. 3 shows TGA curves of the nanocomposites with different particle loadings after 24-hour room temperature curing.

FIG. 3 shows the thermo-gravimetric analysis (TGA) curves of the room temperature cured vinyl ester resin nanocomposites reinforced with different particle loadings. Vinyl ester resin in the 24-hour room-temperature cured nanocomposites was observed to be stable at temperatures lower than 300° C. and decompose at temperatures higher than 300° C. The slight weight loss in the range of 100° C. to 300° C. in the composites with low particle loadings was due to the monomer evaporation.

Figure 4:
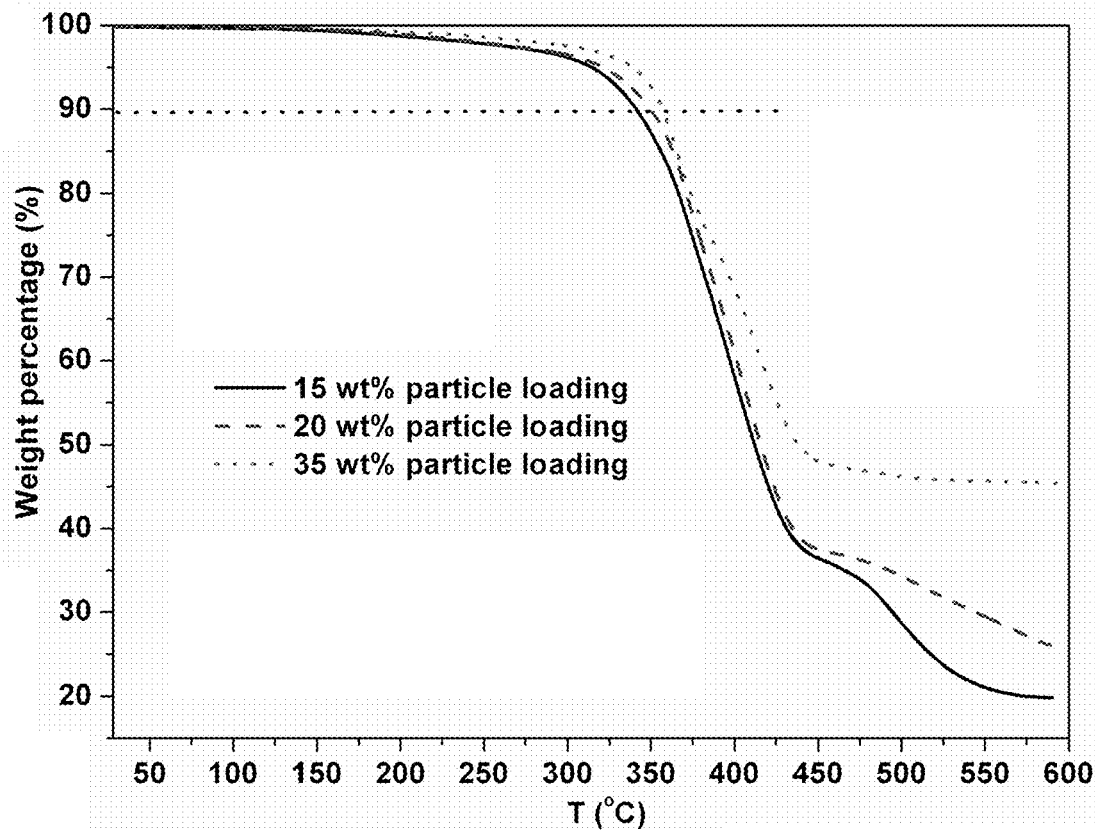
FIG. 4 shows TGA curves of the nanocomposites with different particle loadings after post curing at 100° C.
Figure 5:
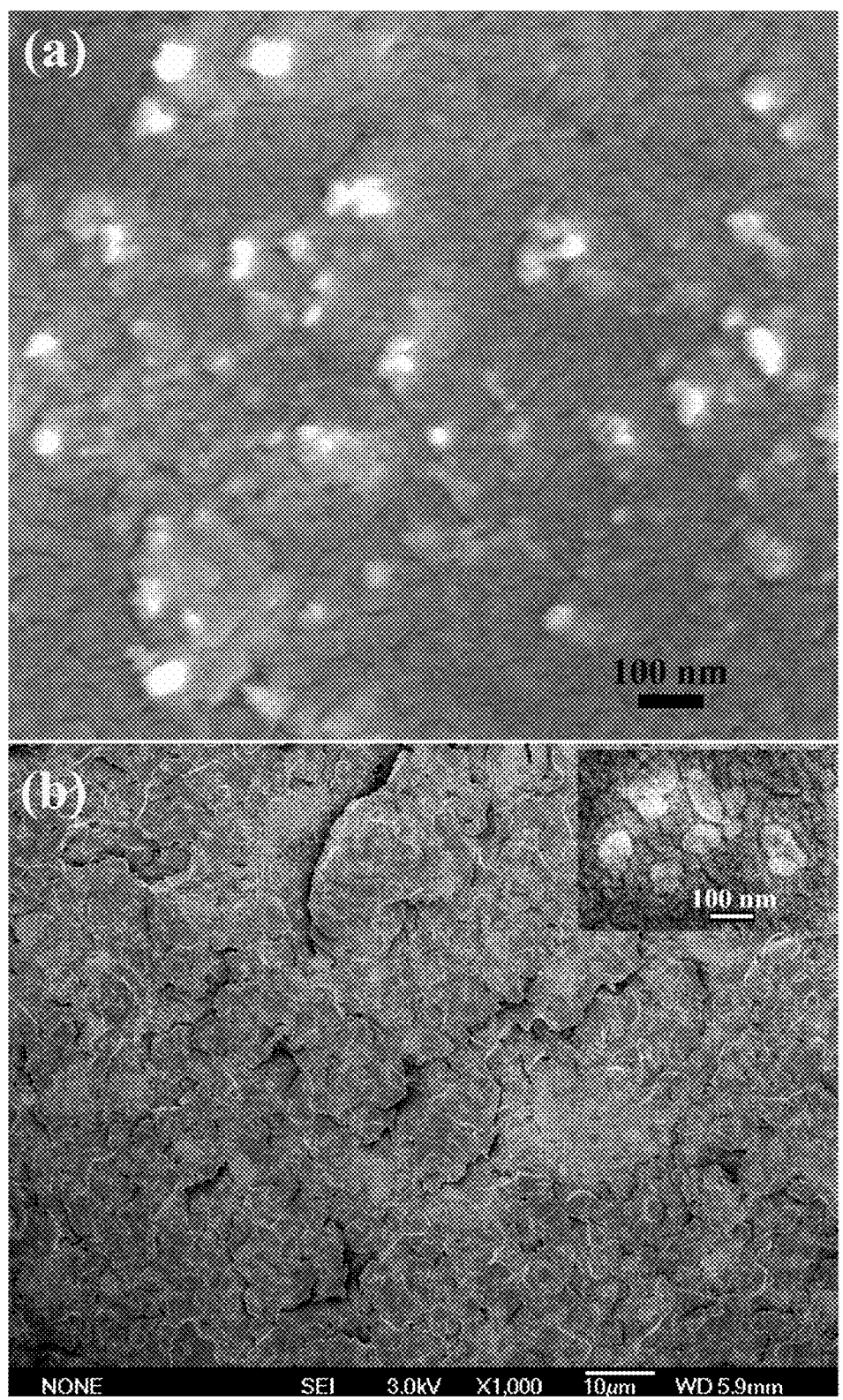
FIG. 5 is an SEM micrograph of (a) the cross-section and (b) fracture surface after tensile test of the nanocomposites with a particle loading of 35 wt %.

A fully cured nanocomposite with a 100% curing extent was deduced after post cure at 100° C. for 2 hours with an observed straight line in the DSC curves (not shown here). The thermal stability of the fully cured nanocomposite was investigated by thermo-gravimetric analysis (TGA). FIG. 4 shows the TGA curves of the fully-cured nanocomposites with different particle loadings. The fabricated polymer nanocomposites can resist to higher temperatures above 300° C. or even higher with the increase of the particle loading. Iron nanoparticles were reported to serve as a catalyst for carbon nanotube/nanofiber formation and may decrease the thermal stability of the nanocomposites. However, the enhanced thermal stability is due to the following synergistic effects. The nanoparticles lower the mobility of the polymer chains which were chemically bounded onto the nanoparticle surface. The bounded polymer, on the other hand, inhibits the active component of elemental iron to catalyze the polymer by forming an iron-vinyl ester complex. The mechanism of the reaction was investigated by X-ray photoelectron spectroscopy (XPS).

The tensile mechanical properties were measured. The Young's Modulus and tensile strength increased 170% and 20%, respectively in the 35 wt % nanocomposite. However, the tensile strength decreased in the 50 wt % nanocomposite because of the noticeable voids.

The particle distribution within the cured vinyl ester resin matrix was characterized by a field emission scanning electron microscope (SEM). FIG. 5(a) shows the typical SEM micrograph of the cross-sectional area of the nanocomposite with a particle loading of 35 wt %. The particles show different sizes in the SEM micrographs. This is due to the particles embedding in different depth in the vinyl ester resin matrix. However, no particle pull-out (i.e., voids) in the samples after polishing was observed indicating a strong chemical bondage between the nanoparticles and the vinyl ester resin matrix.

FIG. 5(b) shows the SEM micrographs of the fracture surface after the tensile test. A rougher fracture surface with many openings was observed in the nanocomposites as compared to the fracture surface characterized by larger smooth areas, ribbons and fracture steps observed in the cured pure vinyl ester resin. This micro-rough structure is attributed to the matrix shear yielding or local polymer deformation between the nanoparticles rather than the intra-particle propagating cracks due to the difficulty in breaking the harder iron nanoparticles. No void/holes arising from the possible peeling off the nanoparticles from the polymer matrix were observed in the high-resolution SEM micrograph as shown in the inset of FIG. 5(b), which is similar to the polished cross-sectional composite sample and indicates a strong chemical interaction between the nanoparticles and vinyl ester resin matrix. The strong interfacial interactions between the nanoparticles and the vinyl ester resin matrix thus have an important effect on the effective transfer of the local stress. The extremely higher specific surface area inherent with the nanoscale particles as compared to the bulk/micron particles together with the strong interfacial chemical bondage between the polymer matrix and the reinforcing nanoparticles effectively facilitate the local stress transfer from the polymer matrix to the tougher metal nanoparticles, which results in a much higher tensile strength as compared with the cured pure vinyl ester resin.

Figure 6:
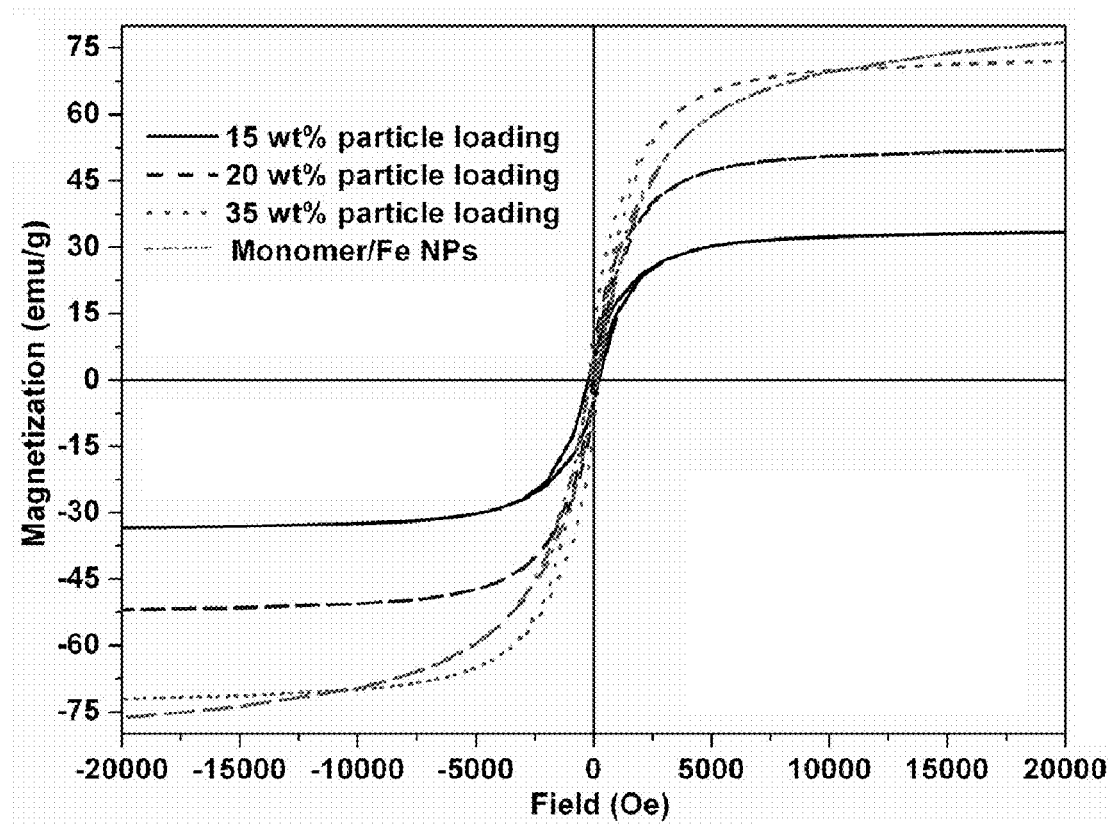
FIG. 6 shows room temperature magnetic hysteresis loops of vinyl ester resin monomer stabilized iron nanoparticles and the iron nanoparticles reinforced vinyl ester resin nanocomposites with different particle loading.

FIG. 6 shows the room-temperature magnetic hysteresis loop of the as prepared vinyl ester monomer stabilized iron nanoparticles and the iron nanoparticles reinforced vinyl ester resin nanocomposites with different particle loading. The monomer stabilized iron nanoparticles were prepared by displacement reaction between iron nanoparticles and vinyl ester resin in ultrasonication and nitrogen protection conditions, washing with tetrahydrofuran and drying in a vacuum oven.

Figure 7:
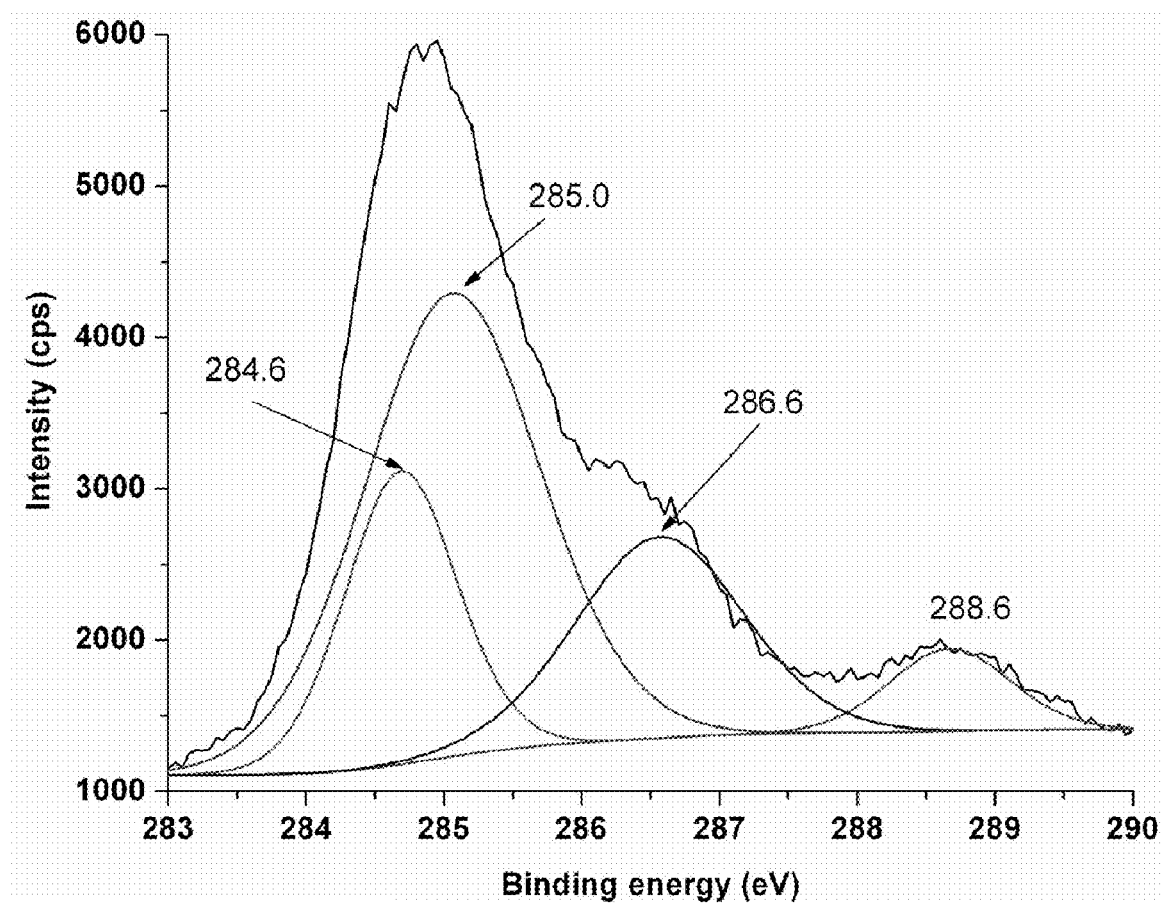
FIG. 7 shows high-resolution carbon is XPS spectrum of THF washed vinyl ester/iron nanoparticle complex.

The magnetization of the monomer stabilized iron nanoparticles and the fully cured vinyl ester resin nanocomposite does not saturate at higher field as shown in FIG. 6. Saturation magnetization was determined by the extrapolated saturation magnetization obtained from the intercept of the magnetization versus H-1 at high field. The calculated Ms was 30.5 emu/g, 52.5 emu/g, and 73.0 emu/g for the vinyl ester resin nanocomposites with a particle loading of 15 wt %, 25 wt %, and 35 wt %, respectively. Ms based on the pure iron nanoparticles was about 203 emu/g, 210 emu/g, and 209 emu/g for nanocomposites with a particle loading of 15 wt %, 25 wt %, and 35 wt %, respectively. All of these values are a little lower than that of the bulk iron (218 emu/g), C. Brosseau and P. Talbot, *J. Appl. Phys.*, 2005, 97, 104325-1/11, which is due to the loss of the active magnetic iron on the nanoparticle surface arising from the iron oxidation either by the displacement or exposure to air during the composite fabrication.

vinyl ester monomers. The nature of the interaction between the nanoparticles and the vinyl ester monomers was investigated by XPS investigation and the XPS samples were prepared carefully as described in Experimental section. FIG. 7 shows the high resolution carbon 1s XPS spectra with all the fitting curves representing different functional groups. The peaks at 284.6 eV, 285.0 eV, 286.6 eV, and 288.6 eV represent C—C and/or C—H, C—C and/or C—H, C—O, and C=O bonds, respectively. These characteristic peaks arise from the vinyl ester resin and thus indicates the presence of vinyl ester resin on the nanoparticle surface. Iron 2p3/2 high resolution XPS spectrum verified partial oxidation of the iron nanoparticle surface arising from the displacement of the vinyl ester resin on the nanoparticle surface.

The nanocomposite formation mechanisms are shown in Scheme 1, where an example of vinyl ester stabilization of iron nanoparticles is shown, with "OR" representing the hydroxyl group in vinyl ester. The active metallic iron nanoparticles react with the hydroxyl functional groups of the vinyl ester monomers and release hydrogen. The vinyl ester monomer serves as a surfactant with one side chemically bound onto the nanoparticle surface. The other side promotes the dispersion of the nanoparticles in the monomer solution. The subsequent addition of the catalyst and promoter serves as a free radical to initiate the monomer polymerization for crosslinkage formation. The carbon-carbon double bonds of the vinyl ester monomers bound onto the nanoparticles also copolymerize with the unbound monomers (styrene for polymer chain growth or vinyl ester monomers for polymer crosslinking growth) to form a robust nanocomposite. The strong chemical bondage between the nanoparticles and the vinyl ester matrix enhances the mechanical properties. The linked vinyl ester serves as a spacer to separate the nanoparticles leading to an observed larger coercivity. The crosslinked vinyl ester resin matrix provides the protection for the iron nanoparticles from further oxidation and dissolution in acidic environments.

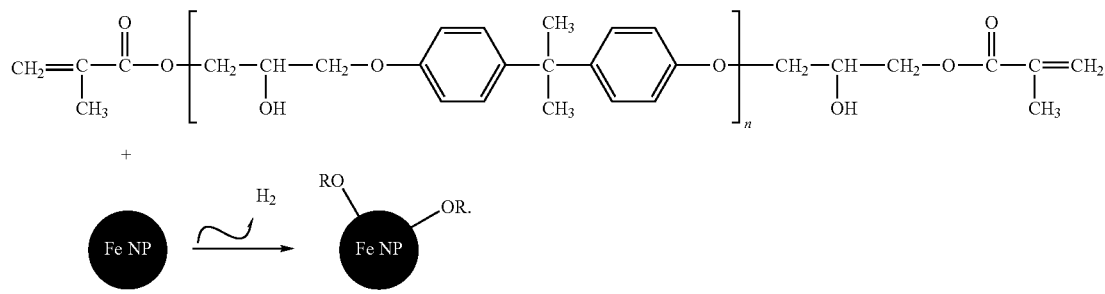

Figure 8:
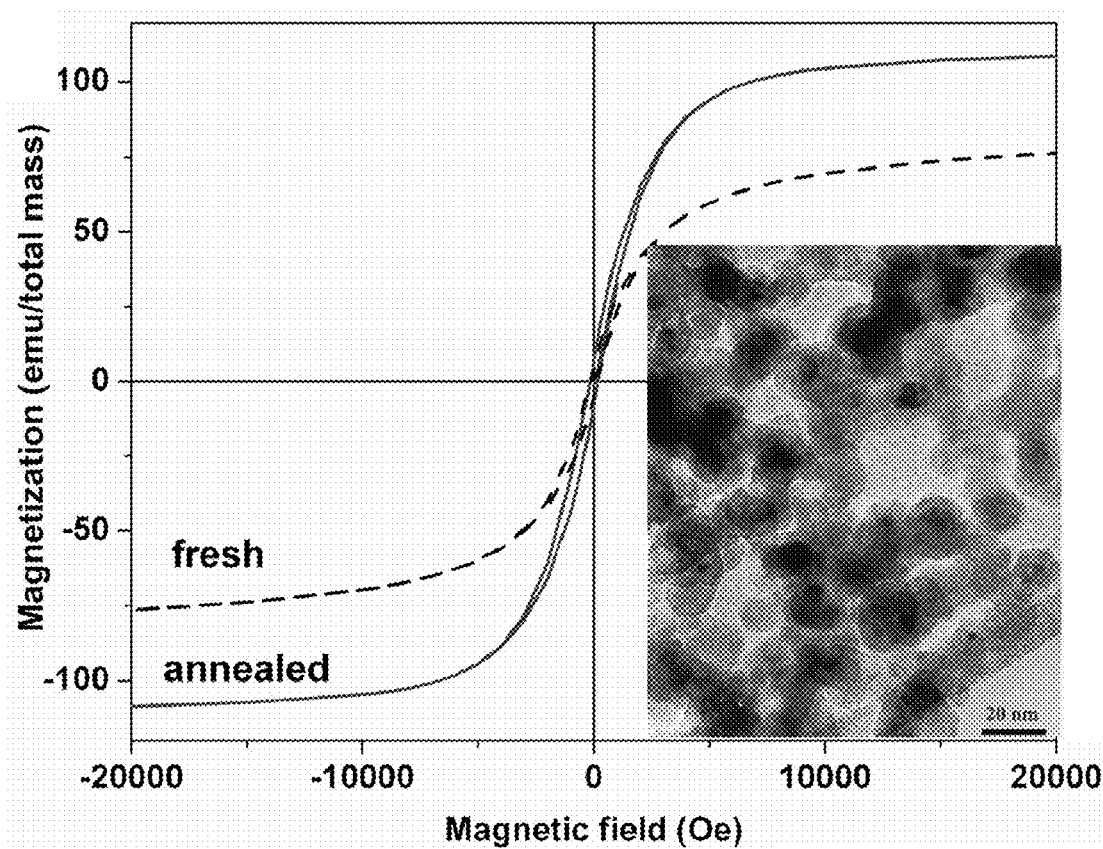
FIG. 8 shows magnetic hysteresis loops of the fresh and annealed vinyl ester monomer stabilized iron nanoparticles; inset shows the TEM micrographs of the as-received nanoparticles.
Figure 9:
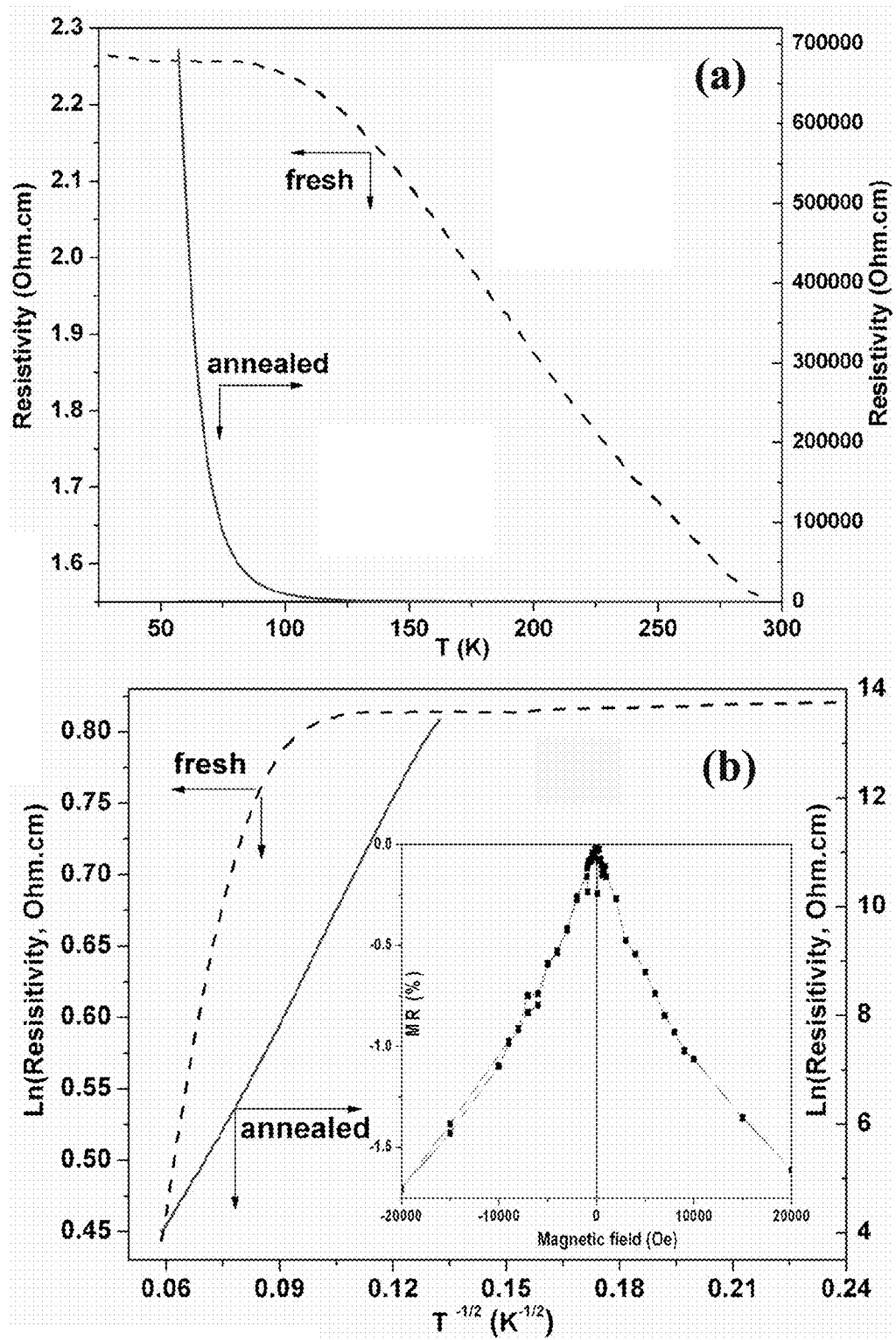
FIG. 9 shows (a) temperature dependent resistivity and (b) Ln (resistivity) as a function of $T^{-1/2}$ of as-prepared and heat-treated monomer stabilized iron nanoparticles; inset of (b) shows the MR of the annealed monomer stabilized nanoparticles.
Figure 10:
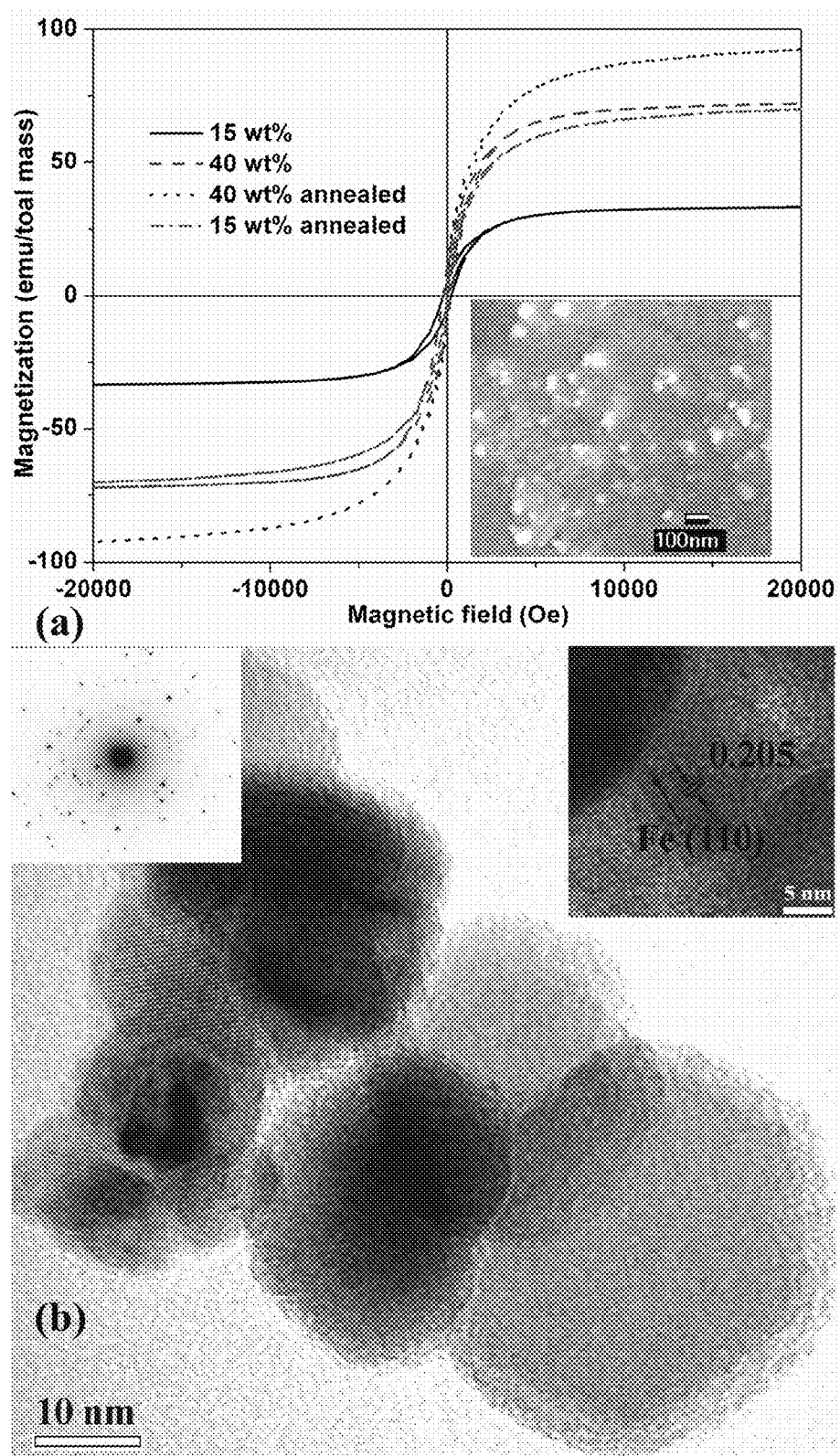
FIG. 10 shows (a) hysteresis loops of as-prepared and heat-treated nanocomposites with a particle loading of 15 and 40 wt %, inset shows the SEM image of nanocomposite with a 40 wt % particle loading; and (b) TEM micrograph of the heat-treated nanocomposite, inset shows the SAED and HRTEM images of nanocomposite with a 40 wt % particle loading.

The iron nanoparticle is reported to have a superparamagnetic zerocoercivity region of 10 nm and a critical size of 100 nm with a maximum coercivity. The coercivity decreases to that of the bulk iron when the nanoparticles become agglomerate with size of microscale. The observed larger coercivity in the nanoparticles after dispersed in the polymer matrix further indicates a fairly uniform dispersion of nanoparticles in the polymer matrix, i.e., the nanoparticles are stabilized by the vinyl ester monomers without agglomeration. Gas bubbles were observed during the particle dispersion in the vinyl ester resin in the air-free nitrogen condition. This is due to the hydrogen generation arising from the displacement reaction between reactive metallic iron nanoparticles and FIG. 8 shows the room-temperature hysteresis loops of the as-prepared and heat-treated vinyl ester monomer stabilized iron nanoparticles. The samples were prepared through a displacement reaction between iron nanoparticles and the vinyl ester resin activated through sonication in a nitrogen environment. The mixture was washed with tetrahydrofuran and dried in a vacuum oven at room temperature. As compared to the reported coercive force (coercivity, Hc) of 5 Oe for the bare superparamagnetic iron nanoparticles, coercivity is observed to increase to 153 Oe after stabilization with the vinyl ester monomers. This is due to the interparticle dipolar interaction within the nanocomposite achieved with a uniform dispersion of single-domain nanoparticles, consistent with a particle loading dependent coercivity in the nanoparticle assembly. Little coercivity difference is observed in the samples after annealing, however the saturation magnetization (Ms, 76 emu/g) of the as-prepared nanocomposites increases to 109 emu/g after annealing due to the decomposition of vinyl ester monomers. The lower saturation magnetization in both composite samples indicates that the displacement reaction has caused the majority of the iron atoms on the nanoparticle surface to become a nonmagnetic salt.

The as-prepared vinyl ester monomer stabilized Fe nanoparticles exhibit lower electric resistivity as compared to the one after heat treatment as shown in FIG. 9(a). The resistivity of the monomer stabilized iron nanoparticles increases slowly with decreasing temperature in the range of room-temperature to 100° C. and then remains constant at temperatures lower than 100° C. However, the nanocomposites become less conductive after the heat treatment. The resistivity increases slowly from room-temperature to 100° C. and suddenly increases beyond the equipment limitation. The linear relation between logarithmic resistivity and the square root of temperature T-1/2 shown in FIG. 2(b) indicates a tunneling conductive mechanism for the heat-treated vinyl ester monomer stabilized nanoparticles. Both non-metallic behaviors were observed in the as-prepared and heat-treated monomer stabilized iron nanoparticle samples, indicating that vinyl ester monomers and the subsequently carbonized vinyl ester have effectively protected Fe nanoparticles from oxidation. There are three regions for the as-prepared vinyl ester monomer stabilized nanoparticles as shown in FIG. 9(b). This behavior could be due to the thermal shrinkage/expansion of the stabilized polymer chain with a change of the temperature. MR (%) in the composite is defined as:

$$MR(\%) = \frac{R(H) - R(0)}{R(0)} \times 100$$

where R(H) and R(0) are the resistivity at a field of H and zero, respectively. A room temperature GMR of 1.7% is observed in the heat-treated vinyl ester monomer stabilized iron nanoparticles as shown in inset of FIG. 2(b). However, only 0.9% MR is observed in the as-prepared vinyl ester monomer stabilized iron nanoparticles.

The particle distribution within the cured vinyl ester resin matrix before the heat treatment was characterized by a scanning electron microscope (SEM). The polymer nanocomposite samples with a particle loading of 40 wt % were prepared by polishing the cured vinyl ester resin samples with 4000 grit sandpaper. The inset of FIG. 10(a) shows the typical SEM images of the cross-section of the nanocomposite. The uniform particle dispersion within the polymer matrix indicates that vinyl ester resin has effectively protected the iron nanoparticles from agglomeration. Further X-ray photoelectron spectroscopy (XPS) investigation indicates a strong particle-polymer interaction through the displacement reaction between the reactive nanoparticles and the vinyl ester resin monomers.

A large shrinkage is observed in the nanocomposites after a two-hour annealing at 450° C. There is no further polymer residue observed after the heat treatment as evidenced by FT-IR investigation. These results indicate a complete decomposition of the cured vinyl ester resin in the polymer nanocomposites. FIG. 10(b) shows the TEM bright field microstructures of the nanocomposite (40 wt %) after heat treatment at 450° C. for 2 h. The left inset of FIG. 10(b) shows the selected area electron diffraction (SAED) patterns of the annealed polymer nanocomposites. The inner ring of the SAED patterns with a d-spacing of 0.34 nm clearly indicates the formation of graphite carbon. The obvious core-shell structure arises from the atomic number difference between iron and carbon. The right inset of FIG. 10(b) shows the high-resolution TEM microstructure of the annealed polymer nanocomposites. The observed clear lattice fringes indicate the formation of highly crystalline nanoparticles and the calculated lattice distance of 0.205 nm corresponds to Fe.

FIG. 10(a) shows the room-temperature hysteresis loops of the vinyl ester resin nanocomposites with a particle loading of 15 and 40 wt % before and after heat-treatment, respectively. Larger coercivity (230 Oe) is observed after the Fe nanoparticles are dispersed in the vinyl ester resin nanocomposites, as compared to those of the bare superparamagnetic iron nanoparticles and vinyl ester monomer stabilized iron nanoparticles. This indicates a weak interparticle dipolar interaction after the nanoparticles are dispersed into the polymer matrix. However, Hc is much lower than those (685 and 900 Oe for 65 and 35 wt % loading, respectively) of the iron/polyurethane system. The saturation magnetizations (Ms) of the nanocomposites are 34 and 72 emu/g for the particle loadings of 15 and 40 wt %, corresponding to 213 emu/g and 183 emu/g for the nanoparticles, respectively. Ms in the vinyl ester resin system is much larger than that in the polyurethane system, which is due to the particle oxidation in the polyurethane nanocomposite fabrication process and particle-polymer surface interaction effects. The observed smaller Hc after the heat-treatment is due to the decreased interparticle distance concomitant with a stronger dipolar interparticle interaction.

Figure 11:
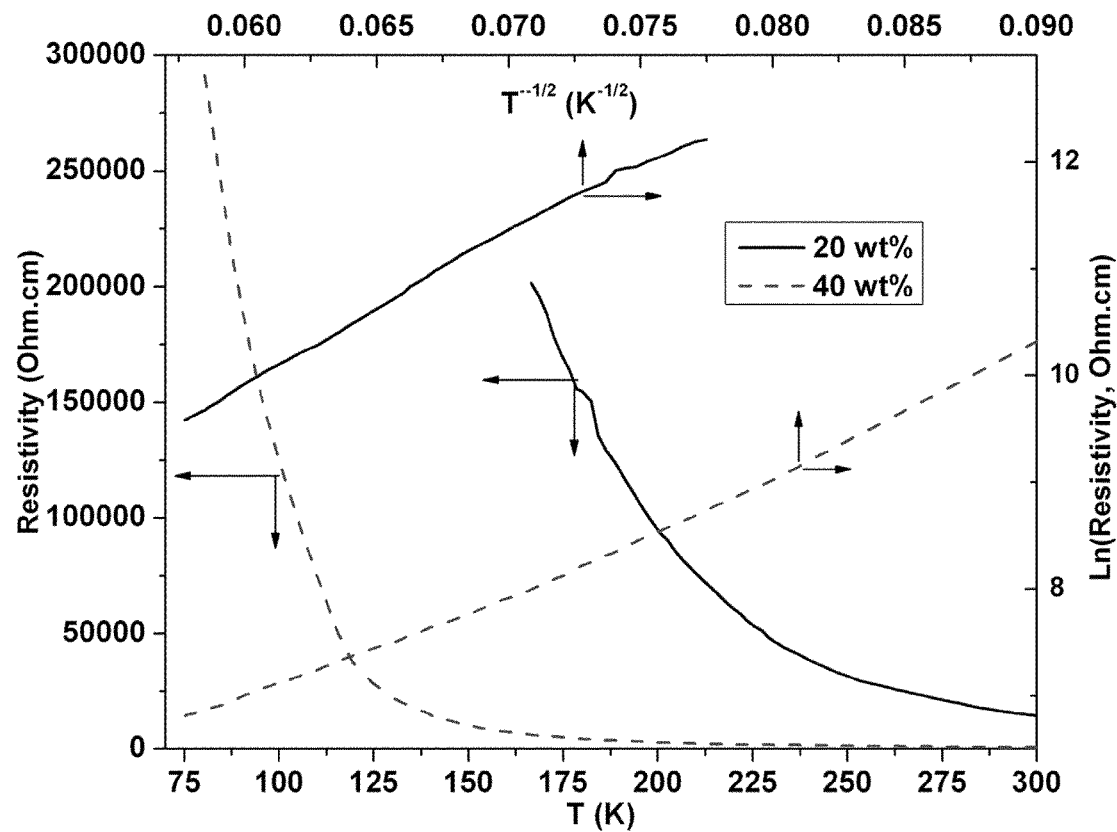
FIG. 11 shows temperature dependent resistivity of the nanocomposite with 20 and 40 wt % particle loading after heat treatment at 450° C.

No electric conductivity is detected in the vinyl ester resin nanocomposites reinforced with the iron nanoparticles, even at 40 wt % loading, indicating the particle loading is still lower than the percolation threshold. The conductivity improves considerably after the heat treatment. FIG. 11 shows the temperature dependent resistivity of the vinyl ester resin nanocomposites after heat treatment at 450° C. for 2 hours. The resistivity increases significantly with decreasing temperature, characteristic of a non-metallic behavior. In view of the high conductivity of iron, the high resistance observed in the 450° C. heat treated specimen is due to the poor conductivity of the carbon matrix. With decreasing temperature, the resistivity increases much faster in the heat-treated 15 wt % nanocomposites than in the heat-treated 40 wt % nanocomposites. This is obviously attributed to the dominating less-conductive carbon matrix in the 15 wt % nanocomposites, as compared to the dominating more-conductive iron in 40 wt % nanocomposites. The observed linear relationship between the logarithmic resistivity and the square root of temperature T-1/2 shown in FIG. 11 indicates an interparticle tunneling/hopping conduction mechanism, which is different from the observed metallic conduction as observed in the granular Co—Au coreshell nanoparticles. The decreased carbon content in the nanocomposite with an initial particle loading of 40 wt % favors electron spin hopping from one particle to another, thus it has a lower resistivity as compared to that of the nanocomposites with an initial particle loading of 15 wt %.

Figure 12:
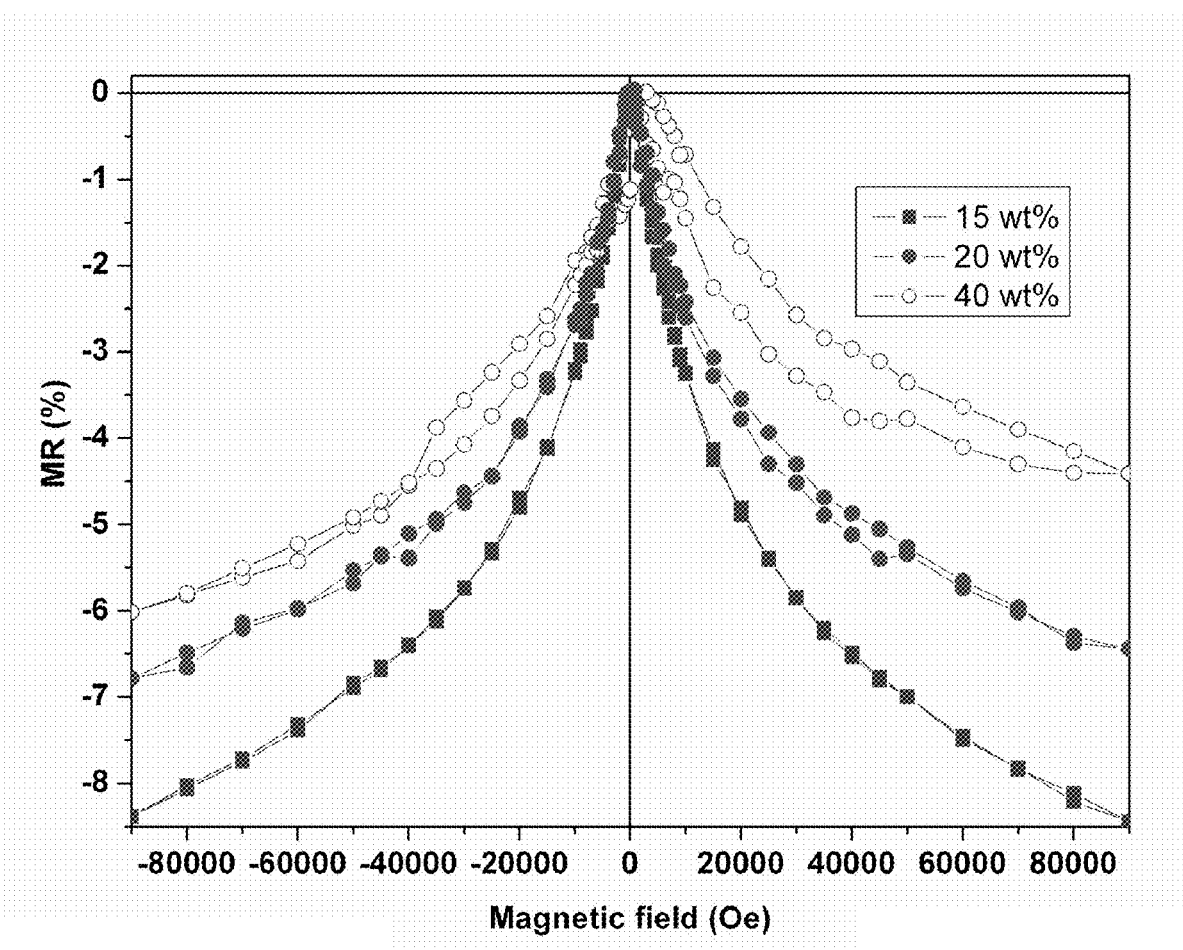
FIG. 12 shows room temperature MR as a function of applied field for heat treated nanocomposites reinforced with a particle loading of 15, 20 and 40 wt %, respectively.

The particle loading was observed to have a dramatic effect on the MR performance of the annealed nanocomposites as shown in FIG. 12. A room temperature MR of 8.3% is observed in the heat-treated nanocomposite with an initial particle loading of 15 wt %, whereas the heat-treated nanocomposites with an initial particle loading of 20 and 40 wt % show a room-temperature MR of 6.8% and 6.0%, respectively. All of these GMR values are observed at a fairly high field of 90 kOe. Compared to multilayered GMR materials, a high magnetic field is required to saturate the MR, which is characteristic of the tunneling conduction mechanism. However, a 2.0% MR observed at 4.5 kOe still indicates that the GMR in these nanocomposites could be used for biological targeting applications. The particle loading dependent MR is attributed to the interparticle distance. In addition, the spacer materials (vinyl ester resin and carbonized vinyl ester resin) play a role in the MR property. The observed field dependent MR hysteresis loops (FIG. 12) in the nanocomposite with high particle loadings are also due to the decreased interparticle distance together with a strong interparticle dipolar interaction.

The foregoing description is that of preferred embodiments having certain features, aspects, and advantages. Various changes and modifications also may be made to the above-described embodiments without departing from the spirit and scope of the inventions. For example, numerous different nano-sized particles may be used to create a nanocomposite according to the present invention, depending upon the desired application. In addition, numerous different polymers may be used to create a nanocomposite according to the present invention, depending upon the desired application.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of fabricating a nanocomposite comprising:
   mixing a plurality of nanoparticles with a plurality of a first monomer to form a mixture;
   blending a catalyst and a promoter with the mixture;
   mixing a plurality of a second monomer with the mixture after the blending of the catalyst and promoter, said second monomer compositionally different from said first monomer; and
   curing the blended mixture to form a polymerized nanocomposite.

2. A method as recited in claim 1, wherein the mixing and blending steps are conducted in anoxic atmospheric conditions.

3. A method as recited in claim 1, wherein the monomer contains a hydroxyl moiety.

4. A method as recited in claim 1, wherein the monomer is selected from the group of monomers consisting essentially of a vinyl ester, an ester, a vinyl alcohol or a urethane.

5. A method as recited in claim 1, wherein the nanoparticles comprise nano-metals selected from the group consisting of chromium, manganese, iron, cobalt, nickel, palladium, silver, platinum, copper, zinc, silver, gold, or lanthanum.

6. A method as recited in claim 1, wherein the catalyst comprises an organic peroxide.

7. A method as recited in claim 1, wherein the promoter comprises cobalt naphthenate.

8. A method as recited in claim 1, wherein the second monomer comprises styrene.

9. A method of fabricating a nanocomposite comprising:
   binding a plurality of at least one monomer to a plurality of metal nanoparticles and a plurality of non-metal nanoparticles to form a mixture of monomer coated nanoparticles;
   blending a catalyst and a promoter with the mixture; and
   curing the blended mixture to form a polymerized nanocomposite.

10. A method as recited in claim 9, further comprising evenly dispersing the nanoparticles within the mixture with ultrasonic stirring.

11. A method as recited in claim 9, further comprising mixing a second monomer, wherein the second monomer is compositionally different from first monomer with the mixture after blending the catalyst and the promoter.

12. A method as recited in claim 11, wherein the second monomer comprises styrene.

13. A method as recited in claim 9, wherein the mixing and blending steps are conducted in anoxic atmospheric conditions.

14. A method as recited in claim 9, wherein the monomer contains a hydroxyl moiety.

15. A method as recited in claim 9, wherein the monomer is a monomer selected from the group of monomers consisting essentially of a vinyl ester, an ester, a vinyl alcohol or a urethane.

16. A method as recited in claim 9, wherein the nanoparticle is a metal selected from the group of metals consisting essentially of chromium, manganese, iron, cobalt, nickel, palladium, silver, platinum, copper, zinc, silver, gold, or lanthanum.

17. A method as recited in claim 9, wherein the catalyst comprises an organic peroxide.

18. A method as recited in claim 9, wherein the promoter comprises cobalt naphthenate.

19. A method of fabricating a nanocomposite comprising:
   mixing a plurality of metal nanoparticles and non-metal nanoparticles with a plurality of monomers to form a mixture;
   blending a catalyst and a promoter with the mixture; and
   curing the blended mixture to form a polymerized nanocomposite.

20. A method as recited in claim 19, wherein the mixing and blending steps are conducted in anoxic atmospheric conditions.

21. A method as recited in claim 19, wherein the monomer contains a hydroxyl moiety.

22. A method as recited in claim 19, wherein the monomer is a monomer selected from the group of monomers consisting essentially of a vinyl ester, an ester, a vinyl alcohol or a urethane.

23. A method as recited in claim 19, wherein the nanoparticle is a metal selected from the group of metals consisting essentially of chromium, manganese, iron, cobalt, nickel, palladium, silver, platinum, copper, zinc, silver, gold, or lanthanum.

24. A method as recited in claim 19, wherein the metal nanoparticle is a nanoparticle selected from the group of metal oxides consisting essentially of $BaTiO_3$ and $TiO_2$.

25. A method as recited in claim 19, wherein the catalyst comprises an organic peroxide.

26. A method as recited in claim 19, wherein the promoter comprises cobalt naphthenate.

27. A nanocomposite made from the method as recited in claim 1.

28. A nanocomposite made from the method as recited in claim 9.

29. A nanocomposite made from the method as recited in claim 19.

* * * * *